United States Patent
Borras et al.

(10) Patent No.: US 11,270,527 B2
(45) Date of Patent: Mar. 8, 2022

(54) USE OF MULTIPLE SENSORY INPUTS FOR DETERMINING VEHICLE OCCUPANCY IN TOLLING APPLICATIONS

(71) Applicant: GEOTOLL, INC., Cooper City, FL (US)

(72) Inventors: Jaime Andres Borras, Miramar, FL (US); Wyatt Drake Geist, Davie, FL (US)

(73) Assignee: GEOTOLL, INC., Cooper City, FL (US)

( * ) Notice: Subject to any disclaimer, the term of this patent is extended or adjusted under 35 U.S.C. 154(b) by 0 days.

(21) Appl. No.: 17/142,937

(22) Filed: Jan. 6, 2021

(65) Prior Publication Data

US 2021/0233331 A1    Jul. 29, 2021

Related U.S. Application Data

(60) Provisional application No. 62/957,658, filed on Jan. 6, 2020.

(51) Int. Cl.

| | |
|---|---|
| *G06K 9/00* | (2006.01) |
| *G07B 15/06* | (2011.01) |
| *G10L 17/24* | (2013.01) |
| *H04W 4/02* | (2018.01) |
| *G06Q 50/26* | (2012.01) |

(52) U.S. Cl.
CPC ......... *G07B 15/06* (2013.01); *G06K 9/00255* (2013.01); *G06K 9/00288* (2013.01); *G06K 9/00838* (2013.01); *G06Q 50/26* (2013.01); *G10L 17/24* (2013.01); *H04W 4/023* (2013.01); *G06Q 2240/00* (2013.01)

(58) Field of Classification Search
CPC ........ G07B 15/06; G10L 17/24; H04W 4/023; G06K 9/00838; G06K 9/00255; G06K 9/00288; G06Q 50/26; G06Q 2240/00
See application file for complete search history.

(56) References Cited

U.S. PATENT DOCUMENTS

| | | | |
|---|---|---|---|
| 9,911,169 B1* | 3/2018 | Geist | G06Q 10/00 |
| 10,972,788 B1* | 4/2021 | Wang | H04N 21/64784 |
| 2012/0143786 A1* | 6/2012 | Karner | G06Q 30/0283 |
| | | | 705/400 |
| 2014/0180773 A1* | 6/2014 | Zafiroglu | G07B 15/063 |
| | | | 705/13 |
| 2018/0144204 A1* | 5/2018 | Miyamoto | G06T 7/50 |
| 2020/0250445 A1* | 8/2020 | Papineau | G01S 5/0027 |

* cited by examiner

*Primary Examiner* — Dhaval V Patel
(74) *Attorney, Agent, or Firm* — The Concept Law Group, PA; Scott M. Garrett; Scott D. Smiley

(57) ABSTRACT

A mobile device runs a tolling application program that, in part, can perform several vehicle occupant detection processes in order to verify the number of occupants in a vehicle. When the number of occupants is verified, then (when the number is more than one) discounts on tolls can be applied to toll transactions. In order to avoid the effect of false positive detections, several occupant sensing modalities are used and the results of each are evaluated to ensure that the correct number of occupants has been determined.

15 Claims, 12 Drawing Sheets

USE OF MULTIPLE SENSORY INPUTS FOR DETERMINING VEHICLE OCCUPANCY IN TOLLING APPLICATIONS

CROSS-REFERENCE

This application claims the benefit of U.S. provisional patent application No. 62/957,658, filed Jan. 6, 2020, the entirety of which is hereby incorporated by reference.

FIELD OF THE INVENTION

The present invention relates generally to occupant sensing for verification of a High Occupancy Toll lane, and more particularly to the synergistic combination of several sensing modalities to determine and verify the number of vehicle occupants.

BACKGROUND OF THE INVENTION

High occupancy toll (HOT) lanes are in increasing used as a way of bypassing traffic and raising revenue for roadways by state and even municipal governments. Alternatively called "express lanes," these lanes are defined on multi-lane freeways in metropolitan regions and offer a paid alternative to the regular lanes. Typically, there are four to six lanes, with one or two of the inner lanes being dedicated as express lane for which a toll is paid. In order to encourage a reduction in traffic though ride sharing or carpooling a discount is offered for vehicles having more than one occupant. In some cases the discount escalates with more occupants.

Originally HOT discounts were provided on a trust basis; a vehicle could receive the discount as a standard charge on the implied promise that the vehicle would always have more than one occupant when using the HOT lanes. The only enforcement of this was by police spotting a vehicle with a HOT sticker or decal that did not have more than one occupant, in which case the driver would be subject to a citation and fine. Despite the threat of a fine, however, there remains a large number of people abusing the system under conventional enforcement. Various tolling agency data indicates the HOT lane violations are as high as 39% in the AM peak times and 32% in the PM peak times. That represents a significant under collection of revenue.

Therefore, a need exists to overcome the problems with the prior art as discussed above.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and explain various principles and advantages all in accordance with the present invention.

DETAILED DESCRIPTION

Figure 1:
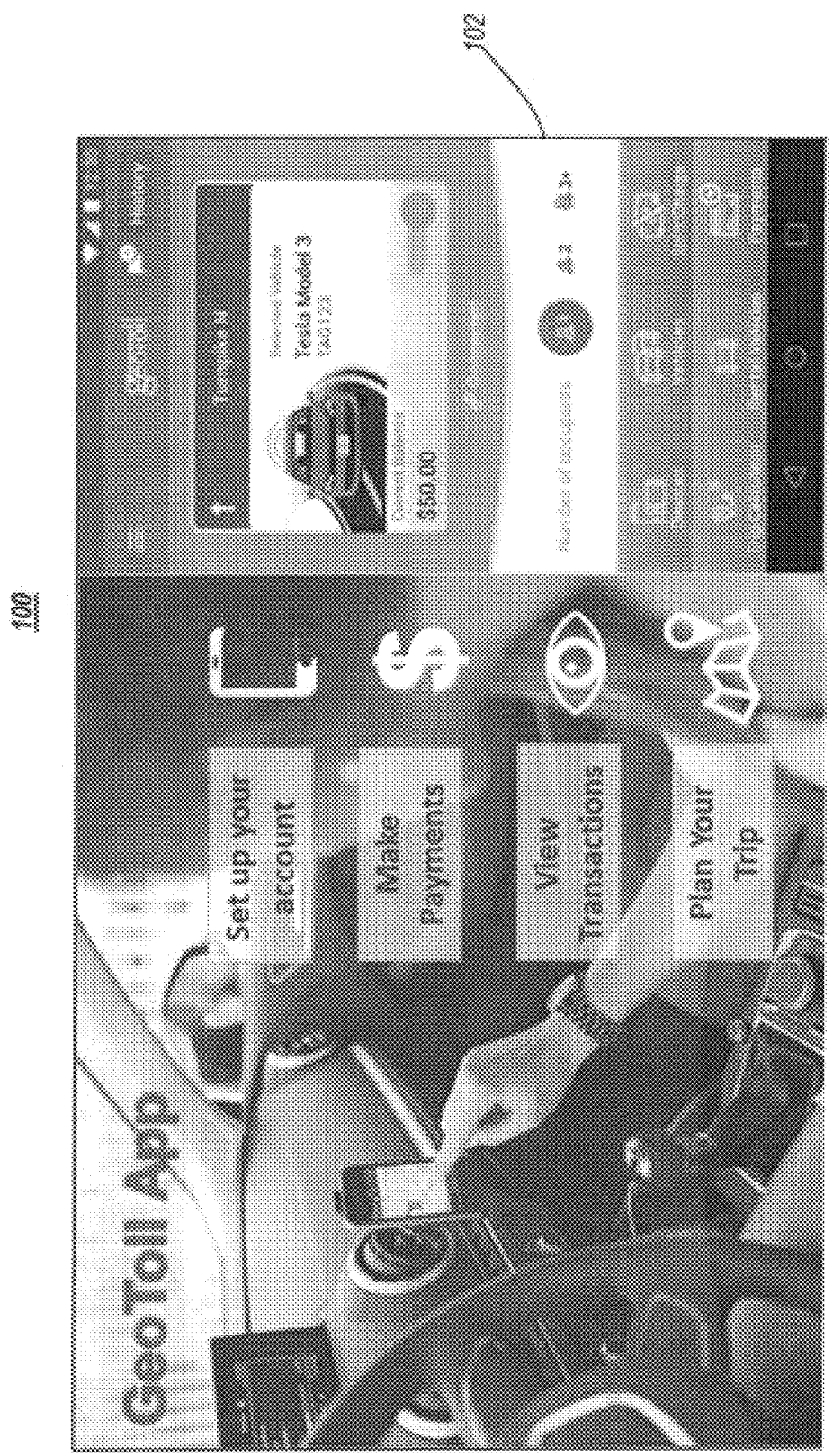
FIG. 1 is an interface diagram for a tolling application on a mobile device, in accordance with some embodiments.

Although the invention is illustrated and described herein as embodied in a method and device that uses multiple sensory inputs to determine a number of occupants in a vehicle for tolling discounts, it is, nevertheless, not intended to be limited to the details shown because various modifications and structural changes may be made therein without departing from the spirit of the invention and within the scope and range of equivalents of the claims. Additionally, well-known elements of exemplary embodiments of the invention will not be described in detail or will be omitted so as not to obscure the relevant details of the invention.

Other features that are considered as characteristic for the invention are set forth in the appended claims. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one of ordinary skill in the art to variously employ the present invention in virtually any appropriately detailed structure. Further, the terms and phrases used herein are not intended to be limiting; but rather, to provide an understandable description of the invention. While the specification concludes with claims defining the features of the invention that are regarded as novel, it is believed that the invention will be better understood from a consideration of the following description in conjunction with the drawing figures, in which like reference numerals are carried forward. The figures of the drawings are not drawn to scale.

Before the present invention is disclosed and described, it is to be understood that the terminology used herein is for the purpose of describing particular embodiments only and is not intended to be limiting. The terms "a" or "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The term "coupled," as used herein, is defined as connected, although not necessarily directly, and not necessarily mechanically. The term "providing" is defined herein in its broadest sense, e.g., bringing/coming into physical existence, making available, and/or supplying to someone or something, in whole or in multiple parts at once or over a period of time.

"In the description of the embodiments of the present invention, unless otherwise specified, azimuth or positional relationships indicated by terms such as "up", "down", "left", "right", "inside", "outside", "front", "back", "head", "tail" and so on, are azimuth or positional relationships based on the drawings, which are only to facilitate description of the embodiments of the present invention and simplify the description, but not to indicate or imply that the devices or components must have a specific azimuth, or be constructed or operated in the specific azimuth, which thus cannot be understood as a limitation to the embodiments of the present invention. Furthermore, terms such as "first", "second", "third" and so on are only used for descriptive purposes, and cannot be construed as indicating or implying relative importance.

In the description of the embodiments of the present invention, it should be noted that, unless otherwise clearly defined and limited, terms such as "installed", "coupled", "connected" should be broadly interpreted, for example, it may be fixedly connected, or may be detachably connected, or integrally connected; it may be mechanically connected, or may be electrically connected; it may be directly connected, or may be indirectly connected via an intermediate medium. As used herein, the terms "about" or "approximately" apply to all numeric values, whether or not explicitly indicated. These terms generally refer to a range of numbers that one of skill in the art would consider equivalent to the recited values (i.e., having the same function or result). In many instances these terms may include numbers that are rounded to the nearest significant figure. The terms "program," "software application," and the like as used herein, are defined as a sequence of instructions designed for execution on a computer system. A "program," "computer program," or "software application" may include a subroutine, a function, a procedure, an object method, an object implementation, an executable application, an applet, a servlet, a source code, an object code, a shared library/dynamic load library and/or other sequence of instructions designed for execution on a computer system. Those skilled in the art can understand the specific meanings of the above-mentioned terms in the embodiments of the present invention according to the specific circumstances.

While the specification concludes with claims defining the features of the invention that are regarded as novel, it is believed that the invention will be better understood from a consideration of the following description in conjunction with the drawing figures, in which like reference numerals are carried forward. It is to be understood that the disclosed embodiments are merely exemplary of the invention, which can be embodied in various forms.

FIG. 1 is an interface diagram for a tolling application on a mobile device, in accordance with some embodiments. The right side of the interface image shown here includes an example of interface page 100 that can be shown on a mobile device (e.g., "smartphone") for a tolling application. Many other interface pages can be rendered/displayed as well, as is well known in the art. The tolling application runs on a mobile device and allows a user to set up a tolling account that can be used to pay for vehicle tolls on roadways, as well as other operations. Such other operations can include the verification of a number of occupants in a vehicle in order to receiving a discounted tolling rate. The tolling application allows the user to make payment (i.e., increase balance for tolling), trip planning, and transaction review. The tolling application further allows a user to identify one or more vehicles for a given toll account, as well as rental cars. The tolling application can also be used to split toll fees among different users sharing a ride.

In order to indicate a number of vehicle occupants, the user can select icons corresponding to 1, 2, or 3 or more occupants in field 102. In some embodiments the user can enter a number to indicate the number of vehicle occupants using a keypad input interface. Once the number of occupants is indicated, the tolling application then undertakes a verification process wherein two or more occupant sensing modalities are used to detect other occupants, or the mobile devices of other occupants, in order to verify the number of vehicle occupants. Once the number of occupants is verified, then a reduced toll rate is applied in certain tolling instances, such as toll express lanes. The mobile device can present the verified results to a backend server that the mobile device interacts with for tolling transactions so that the backend server can figure the tolling discount into tolling transactions. The backend server finalizes tolling transactions with a tolling agency.

In the ordinary course of a tolling transaction, the tolling agency will have a record of a vehicle passing a tolling point (e.g., a gantry location or a geofence defined tolling point). Typically, either the vehicle has a wireless tolling transponder that has a unique identifier associated with an account or the vehicle, and/or a picture of the vehicle license tag has been taken and processed to identify the vehicle, and any associated toll account. When the toll service, which is separate from the toll agency, communicates with the tolling agency, the toll service can present information indicating that a given toll transaction is entitled to a discount because the toll service has verified that the toll event occurred when the vehicle was carrying multiple occupants and is therefore entitled to a discount from the typical toll fee.

Figure 2:
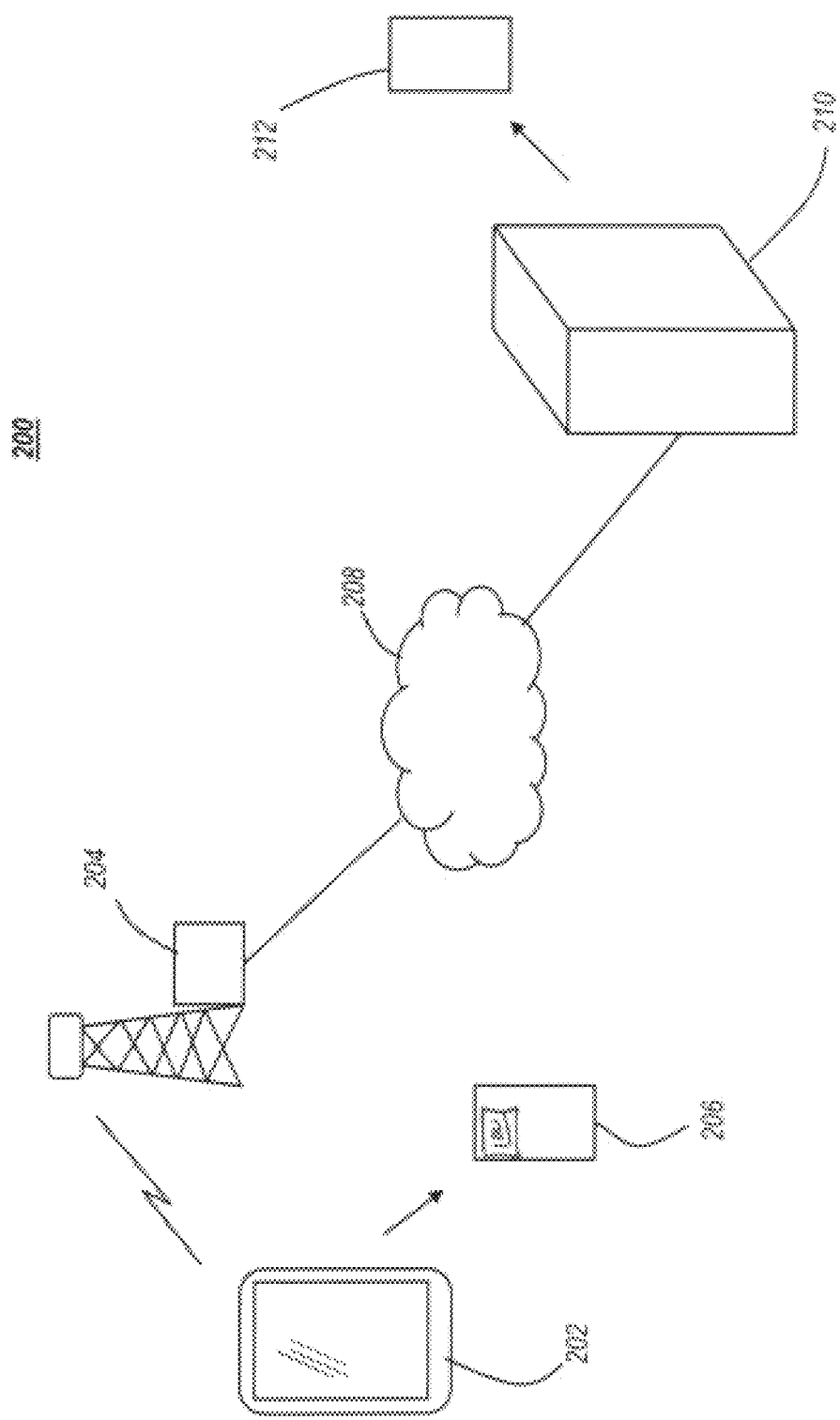
FIG. 2 shows a system diagram in which a mobile device operating a tolling application program communicates with a back end server, in accordance with some embodiments.

FIG. 2 shows a system diagram of a system 200 in which a mobile device 202 operating a tolling application program communicates with a backend server 210, in accordance with some embodiments. The mobile device 202 includes a memory space 206 (shown abstracted from the mobile device 202) in which tolling application 100 is instantiated and running. The mobile device 202 includes several wireless communication interfaces, including a cellular communication transceiver that allows the mobile device 202 to communicate with cellular network infrastructure such as a base station 204. The cellular infrastructure is networked to a wide area network 208 such as the Internet. Likewise, the toll service backend server 210 is also coupled to the network 208. Accordingly, the mobile device 202 can communicate with the backend server 210. The backend server 210 can be equipment in a data center operated by a toll service or in the Cloud. The toll service maintains toll accounts for subscribers and settles toll transactions with toll agencies. As used herein, a toll agency is an entity responsible for operating toll equipment on roadways. Generally, a toll agency is a governmental entity, and a toll service is a non-governmental entity. At periodic times, the toll service equipment settles toll transactions with various toll agencies. Ordinarily a standard toll is applied for each toll event for a given subscriber, but a toll service can indicate that a given toll event occurred when the vehicle responsible for the toll event was entitled to a multi-occupant discount and reduce the settlement amount on behalf of the subscriber. The toll agency allows this because the toll service has put verification measures, as described herein, in place to ensure the subscriber is actually entitled to the multi-occupant discount.

In addition to settling transactions with toll agencies, the backend server 210, or equivalent equipment of the toll service's data center, can process data received from the mobile device 202. For example, image processing for facial recognition can be performed on images captured by the mobile device 202 and transmitted to the backend server 210. A recognition process 212 can be used to identify human facial features in an image in order to count the number of faces viewable in the image. This can be used such as when the tolling application on the mobile device captures a "selfie" image of the occupants of the vehicle to verify the number of occupants, and then transmits the image to the backend server 210. Alternatively, the mobile device 202 can perform the facial recognition process and transmit a redacted image to the backend server 210 as evidence of the number of occupants in the vehicle.

Of course, the use of any one means of verifying the number of vehicle occupants is subject to manipulation by the subscriber. For example, a life sized image of a person's face on a cardboard stock could be used to cause a facial recognition algorithm into falsely detecting a face. To reduce the chance of such manipulation of the vehicle occupant verification process, several occupant sensing modalities are used together and their results are evaluated in sum in order to decide the number of vehicle occupants.

Figure 3:
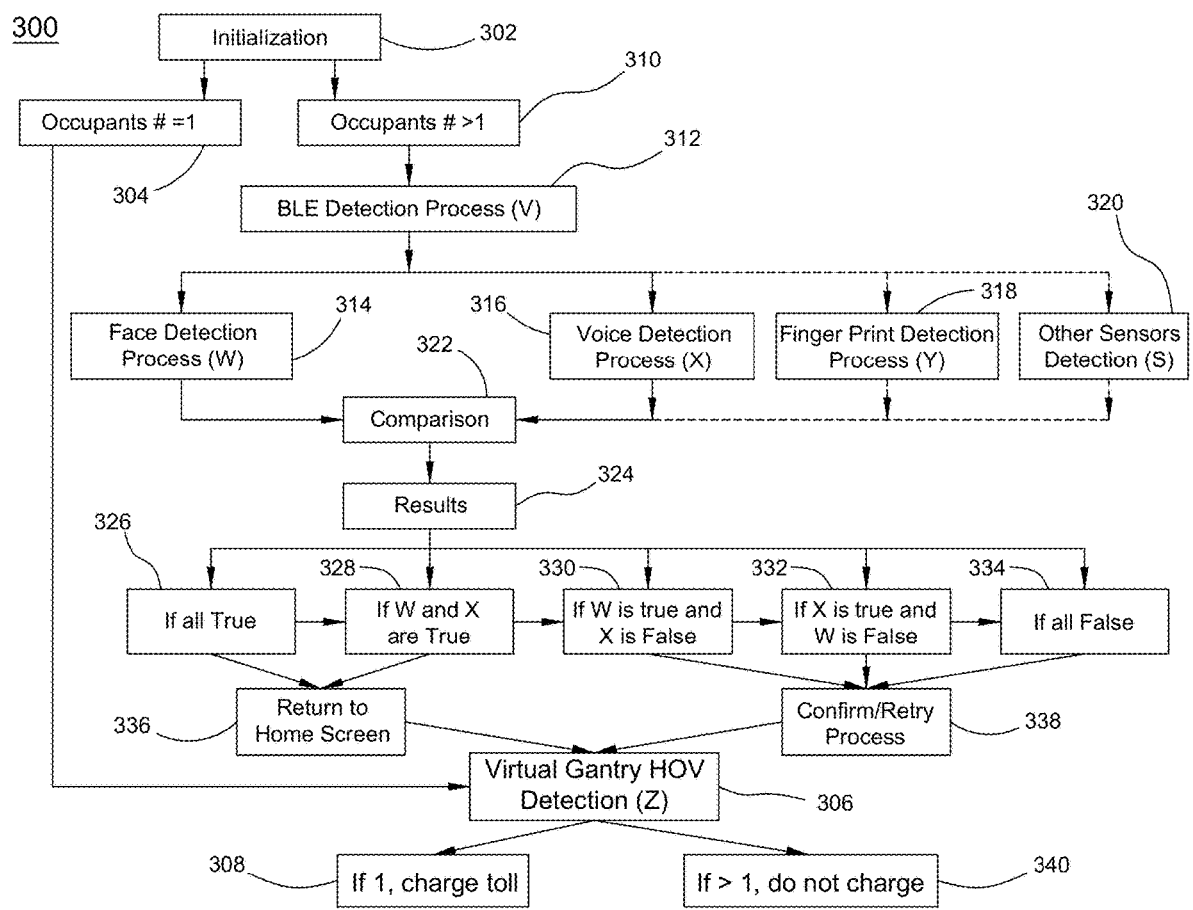
FIG. 3 is a is a flow chart diagram of a method for combining multiple sensors in an occupant number verification process for a tolling application, in accordance with some embodiments.

FIG. 3 is a flow chart diagram of a method for combining multiple occupant sensing modalities in an occupant number verification process for a tolling application, in accordance with some embodiments. The method 300 is performed by a mobile device (e.g., mobile device 202) running an application program designed in accordance with the present disclosure. At the initialization 302, the application program is instantiated and operated to bring up an interface where the user is prompted or otherwise able to enter a number of vehicle occupants. For example, the application program can be designed to assume ordinary toll fees will apply to all toll transactions for a given driving event, but an optional interface can be accessed in order to allow the user to enter, and have verified, the number of vehicle occupants in order to be entitled to a toll discount that may be allowed by toll agencies operating the tolling points through which the vehicle passes during the driving event. In some embodiments the application program may prompt the user for the number of occupants as a standard operation. Thus, in step 304, the number of occupants is either entered as "1" or assumed to be one, and in which case the method proceeds to ordinary tolling point detection in step 306.

Alternatively, in step 310, the user can enter a number higher than "1" to indicate there are other occupants in the vehicle. Once the number has been entered in step 310, the mobile device can then undertake a detection process in step 312 where the mobile device attempts to detect other mobile devices using a low power wireless network interface, such as that known by the name BLUETOOTH or BLUETOOTH LOW ENERGY, or similar interfaces. In some embodiments the mobile device performing the method 300 can look for beacons periodically and routinely transmitted by the other mobile devices, or the other mobile devices can be operated by a similar application program to transmit a specific beacon to indicate they are present and associated with the mobile device performing the method 300. As a result of performing step 312, the mobile device performing method 300 will count the number of other mobile devices detected, which may or may not match the number entered by the user in step 310. To further verify the number of vehicle occupants, the method 300 uses one or more secondary occupant sensing modalities which can be performed separately. The secondary processes can include a face detection process 314, a voice detection process 316, a fingerprint or other biometric process 318, and other sensing processes such as, for example, communicating with the vehicle system to query the vehicle regarding seat sensors, seat belt sensors, and so on, which indicate a seat is occupied by a person.

Briefly, the face detection process 314 involves use of the mobile device performing method 300 to capture a "selfie" image in which all the occupants of the vehicle can be seen. Of course such process would only be undertaken when the vehicle is parked. The captured image is then processed to recognize facial features, but not to identify the individuals. Faces, once recognized, can be over-pixelated in the image to obscure the faces in order to prevent identification later and to protect occupants' privacy. The recognition can be performed by the mobile device, or by a backend server (the mobile device having transmitted the image to the backend server).

The voice detection process 316 can be performed in a passive manner or an active manner. In the passive manner the mobile device "listens" to people speaking by processing audio received at the microphone of the mobile device, and applies a speech recognition algorithm to the received speech to identify different speakers. In the active manner or mode, the mobile device can prompt each occupant, in turn, to say a phrase or word, which can be preset or randomly generated/selected in order to ensure the voice is not, for example, a radio or other artificial audio source. Alternatively, the mobile device can prompt the other occupants' mobile devices, in turn, to collect an audio sample of the respective owners of those other mobile devices, and transmit the speech sample using the low power wireless network interface to the mobile device performing method 300. The speech sample (or samples) is analyzed to differentiate various speakers and ensure that they are different people. The number of unique speakers detected is used to indicate the number of vehicle occupants. In some embodiments certain measures can be taken to avoid false voice detections such as detecting speech coming from a radio, or from people outside of the vehicle. For example, the mobile device can communicate with the vehicle system to ensure that the radio is off and that the windows are closed.

Other occupant sensing modalities in steps 318 and 320 can be used as well. In step 318 fingerprint detection can be used where each occupant provides a fingerprint input to be compared to a stored fingerprint record that has been previously verified in order to prevent a user simply using two different fingers. The mobile device can be provided with a fingerprint reader or camera accessory designed to facilitate capturing a fingerprint image. In step 320 the mobile device performing method 300 can communicate with the vehicle system to determine, for example, the number of seats occupied in the vehicle.

Each of steps or processes 314, 316, 318, 320, and 312 are evaluated to produce a number which indicates the number of unique vehicle occupants detected by the respective process. Since a given process can be "fooled" into counting more than the actual number of occupants, the method 300 evaluates the results of several occupant detection modalities and compares them in step 322 to evaluate whether the number of detected occupants matches the number input by the user in step 310. Accordingly, in step 324 each of the results of comparing the output of processes 312-320 with the number provided in step 310 are collected and evaluated in a logic array of steps 326-334. Step 326 applies when all of the occupant sensing modalities agree with the number input in step 310, in which case the number provided in step 310 is used to determine any applicable multi-occupant toll discount and the tolling application returns to its home screen in step 336. Likewise, in step 328, if the facial recognition process 314 and the voice recognition process 316 agree with the number provided in step 310, then regardless of the result of step 312 the number will be deemed confirmed. However, as indicated in steps 330 and 332, if the voice recognition process 316 and the facial recognition process 314 disagree, then a retry/confirm process 338 may be commenced, as is the case if none of the occupant sensing modalities agree in step 334.

In the confirm/retry step 338, the user is given the option to repeat one or more of the occupant sensing processes (312-320), or to self-confirm that the number provided in step 310 is correct. If the user indicates a desire to repeat a process 310-320 then the mobile device repeats the selected/indicated process(es). Otherwise, if the user selects to self-confirm the number, the tolling application will provide a cautionary message indicating that the user may be liable for violation fees if the number is found to be inaccurate, prompting the user to acknowledge the caution before accepting the self-confirmation and proceeding to step 306. Upon self-confirming the number of occupants, where one or more of the occupant sensing modalities failed to confirm the number, the mobile device can send a message to the backend server indicating a self-confirmation was used, and in response, the backend server can then send a message to an appropriate law enforcement agency indicating details of the vehicle, the number of reported occupants, and a location or roadway name. The information can then be transmitted to traffic enforcement vehicles in the region, who may choose to observe the vehicle to determine if the number of self-confirmed occupants is correct. Once the occupant number is finalized, then in step 306 when toll events occur (e.g., the vehicle passes through a tolling point/gantry location) the user will be assessed a toll fee accordingly in steps 308 or 340. In step 308 the user is charged the full toll fee, and in step 340 the user is charged a discounted toll fee (or no toll).

Figure 4:
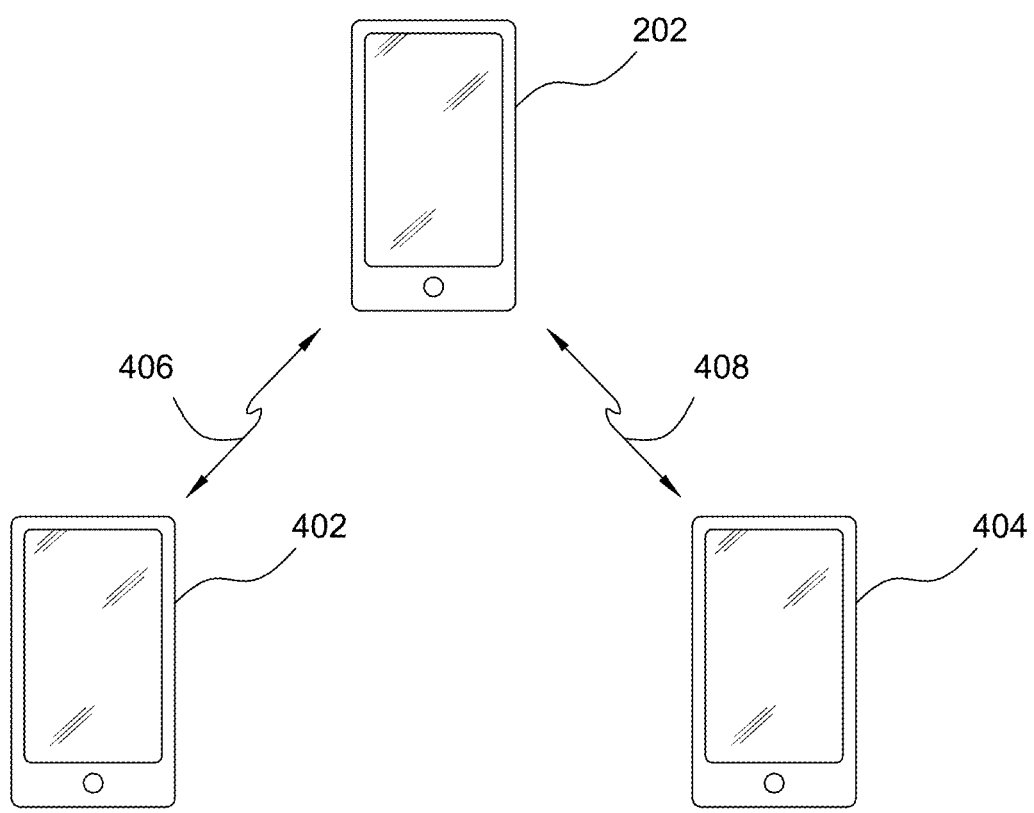
FIG. 4 is a diagram showing detection of nearby mobile devices using low power wireless networking interface, in accordance with some embodiments.

FIG. 4 is a diagram showing detection of nearby mobile devices using low power wireless networking interface, in accordance with some embodiments. In the process of performing occupant sensing processes, mobile device 202 can perform method 300 or a similar method. One or more of those occupant sensing processes can involve mobile device 202 communicating with, or receiving signals from other mobile devices 402, 404 which may be possessed by other vehicle occupants. The signals 406, 408 can be transmitted and received using a low power wireless networking protocol. In one sensing modality, mobile device 202 can detect beacon signals routinely transmitted by mobile devices using a particular low power wireless networking protocol as a routine aspect of that protocol. In other words, the beacon can be transmitted without regard to method 300 as part of ordinary operation of the low power wireless network protocol to allow other devices to discover the mobile device transmitting the beacon. In some embodiments, each one of the mobile devices 202, 402, 404 can be running a tolling application program and mobile devices 402, 404 can be operated by their respective instantiation of the tolling application program to transmit information to mobile device 202. The information can be simply a beacon that uniquely identifies the mobile device 402, 404 transmitting the beacon. For example, the beacon can include an identifier of the mobile device such as media access controller address, an international subscriber equipment identifier, or a unique account identifier used to access the account information at the backend server. It is further contemplated that the process of detecting the other mobile devices 402, 404 can be performed periodically during the driving event, or upon the occurrence of tolling events, in order to verify that the other mobile devices are still present in the vehicle. Furthermore, this process allows the splitting of the toll charge in toll roadways where there is no discount for more than one occupant in the vehicle.

Figure 5:
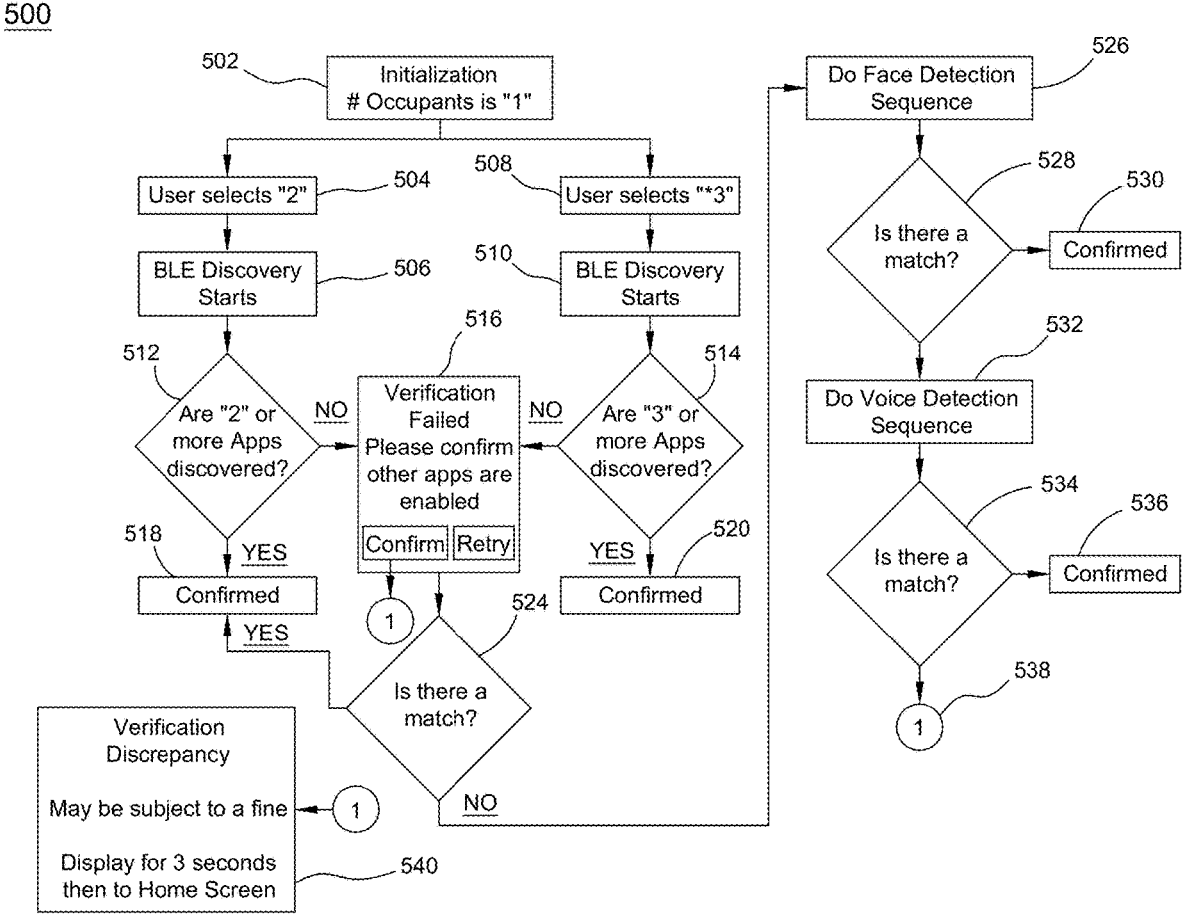
FIG. 5 is a flow chart diagram of a method for verifying a number of vehicle occupants for a tolling discount, by a mobile device, in accordance with some embodiments.

FIG. 5 is a flow chart diagram of a method 500 for verifying a number of vehicle occupants for a tolling discount, by a mobile device, in accordance with some embodiments. Method 500 can be performed by a mobile device (e.g., 202) in the course of verifying the number of vehicle occupants. In step 502 the number of vehicle occupants can be initialized as "1". The user can then be presented with an interface on the mobile device by the tolling application program in which the user can select "2" or "3+" (for 3 or more) in steps 504, 508, respectively. These numbers may provide a different level of tolling discount based on the number of occupants. After the user selects the number in either of steps 504, 508, then in steps 506, 510 the mobile device attempts to discover other mobile devices using, for example, the BLUETOOTH Low Energy (BLE) interface. In steps 512, 512 the mobile device determines, after a suitable period of time, if the corresponding number of other mobile devices have been discovered/detected. The mobile device performing the method 500 is automatically counted, so only the additional number of mobile devices need to be detected. For example, if the number selected is "2," then only one other mobile device must be detected to confirm the selection.

If the number of other devices detected plus the one equals the selected number, then the number is confirmed in steps 518, 520, otherwise the method 500 proceeds to step 516 in which the mobile device presents information indicating the verification failed. The user can then self-confirm the number or request a "retry." If the user self-confirms the number then proceeding through step 522 to 540 the user is presented with a caution message indicating the user may be subject to a fine if the actual number of vehicle occupants is different than the self-confirmed number. If the user requests "retry" in step 516, then the process of attempting to detect other mobile devices is repeated. The user can either select a new number (e.g., steps 504, 508) or proceed with the same number. If, upon repeating the detection process the indicated number of occupants cannot be verified by detecting other mobile devices, then the method 500 can move to an alternative verification stage in step 524. For example, in step 526 a face detection process can be commenced to detect a number of faces of occupants in the vehicle.

In the face detection process 526 the mobile device can prompt the user to hold the mobile device up, enable the forward-facing camera on the mobile device, resulting in a live image being displayed on the graphic display of the mobile device. All of the occupants of the vehicle can move to be in the frame of the image. An image can then be captured automatically or by the user actuating the mobile device to capture the image. The image can be analyzed using a face detection algorithm that identifies likely human facial features. For each face detected in the image, a box or border can be placed around the detected face, and the number of detected faces can be counted and afterwards redacted. The analysis of the image can be performed by the mobile device, or by a backend server after receiving a copy of the image from the mobile device which reports the number back to the mobile device. In step 528 a comparison is made of the number of faces detected and the number selected in steps 504 or 508. If the numbers match then the number of occupants is confirmed and the process terminates in step 530. If the numbers do not match in step 528, then another form of occupant detection can be used. For example, in step 532 a voice detection process can be performed. In the voice detection process, either the mobile device can "listen" passively to speech occurring in the vehicle, or the mobile device can prompt the occupants to each individually provide a voice sample by speaking a phrase. The phrase can be selected by the user, or selected by the mobile device. The voice samples are then evaluated in step 532 to identify characteristics such as pitch, harmonic content, and other aspects that can be used to identify distinct speakers. If the mobile device detects a number of unique speakers (people) in step 534, then the number of occupants is confirmed in step 536, otherwise the method 500 can proceed to a further occupant detection modality or through step 538 to self-conformation of the number of occupants, resulting in the caution message of step 540 being shown.

Figure 6:
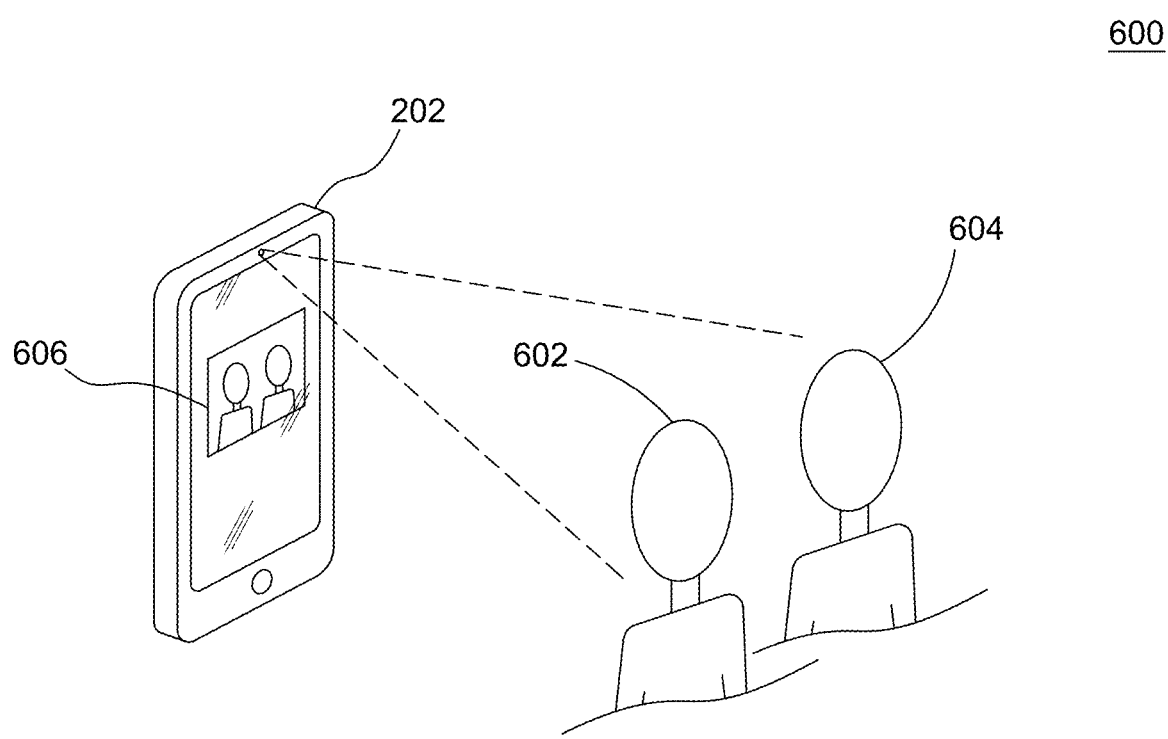
FIG. 6 is a diagram showing image capture for a photographic verification of a number of vehicle occupants, in accordance with some embodiments.
Figure 7:
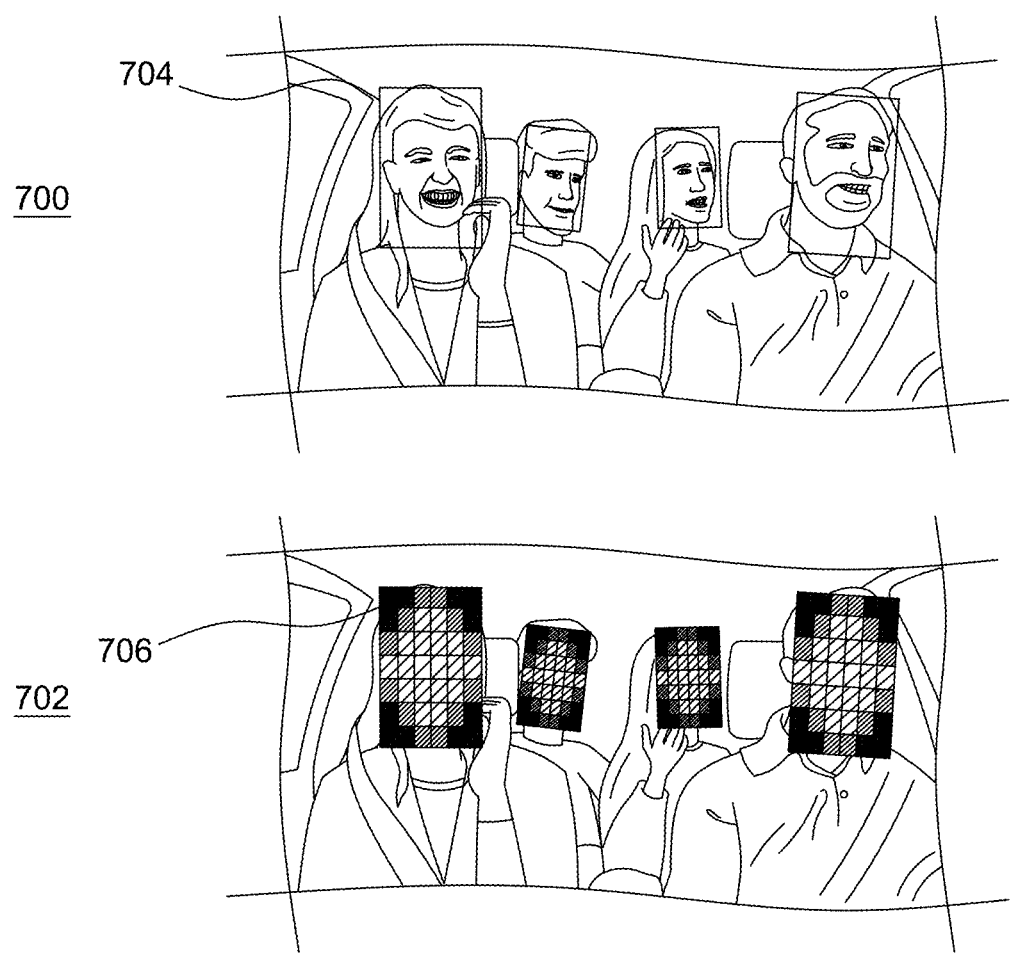
FIG. 7 is a sequence diagram of a captured and processed image taken by a mobile device under control of a tolling application, in accordance with some embodiments.

FIG. 6 is a diagram showing image capture for a photographic verification of a number of vehicle occupants, in accordance with some embodiments. FIG. 6 represents an interior of a vehicle 600 in which two occupants 602, 604 are located. The mobile device 202 is in the process of verifying the number of occupants using face detection, as in steps 314 or 526. The mobile device 202 can be held by one of the occupants 602, 604, and the front-facing camera is activated, resulting in an image 606 of the occupants being shown on the graphic display of the mobile device 202. The user of the mobile device can then analyze an image or images captured by the camera of the mobile device 202. An example of this process is shown in FIG. 7. Image 700 shows a captured image of occupants of a vehicle. Four faces are detected, and boxes 704 are drawn by the application program around the detected faces. The image 702 is produced by pixelating the regions 706 inside the boxes to obscure the faces of the occupants. Furthermore, features of the vehicle can be recognized in order to verify that the occupants are actually inside of the vehicle. For example, door and window features can be identified, along with seat and headrest features. In other embodiments the presence of the vehicle can be detected by a wireless connection to the vehicle system (e.g. BLUETOOTH audio).

Figure 8:
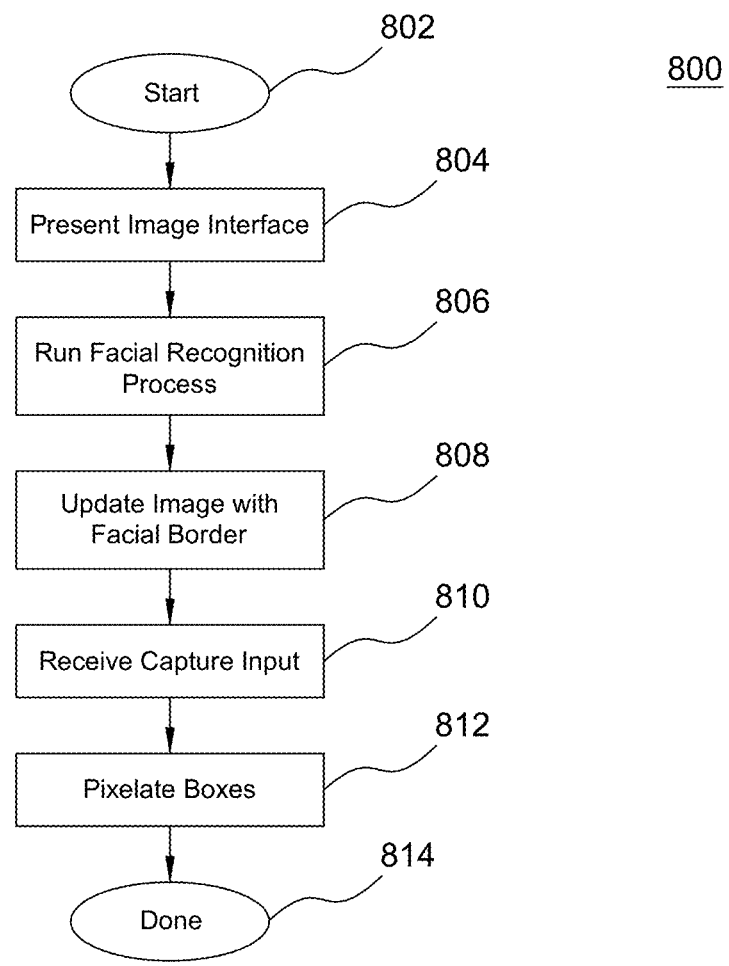
FIG. 8 is a flow chart diagram of a method for acquiring and processing an image of vehicle occupants to verify the number of vehicle occupants, in accordance with some embodiments.

The process is shown in FIG. 8, which is a flow chart diagram 800 of a method for detecting faces in relation to verifying the number of vehicle occupants for tolling purposes. At the start 802 the mobile device is running the tolling application program which prompts the user to gather occupants in the mobile device. In step 804 an image interface is presented in which the image of the occupants is captured, either automatically or by actuation of the mobile device. In step 806 a face detection process is performed on the image or the video (which is a sequence of images) being displayed. In step 808 the image is updated or edited to include boxes around the detected faces. In step 810 the user may provide an input to capture the image being displayed (with the boxes around detected faces) if the video feed is being analyzed. This would occur when all of the occupants' faces have been identified as indicated by the boxes around their faces in the image being displayed on the mobile device. Then in step 812 the boxed regions are pixelated. The number of pixelated boxes is equal to the number of detected occupants. The method 800 illustrates embodiments where the live image is constantly being evaluated to detect faces, and when all of the occupant's faces are detected, then the user can actuate the mobile device, or the mobile device can recognize that the number of faces detected is equal to the number of occupants selected/input by the user to finalize the process in step 814.

Figure 9:
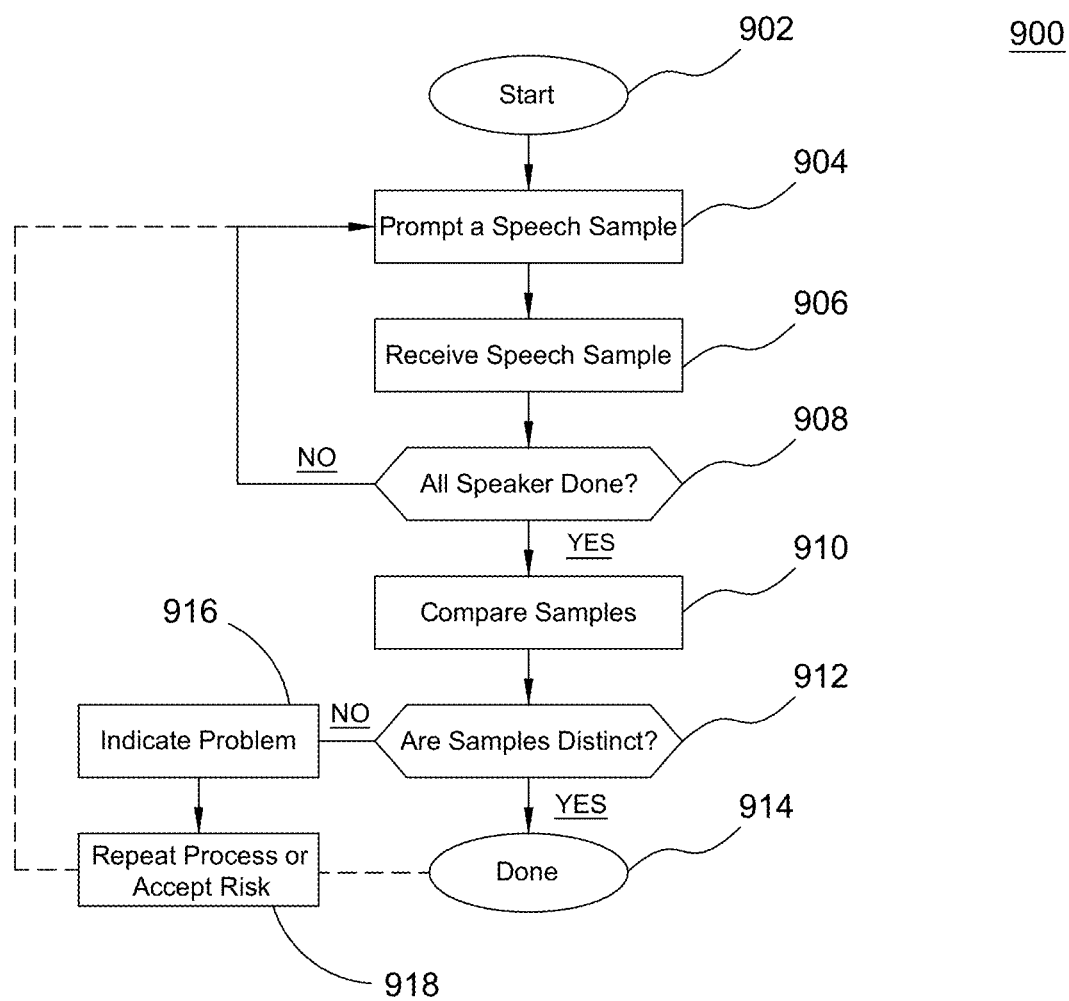
FIG. 9 is a flow chart diagram of a method for eliciting and processing a speech sample from vehicle occupants to verify the number of vehicle occupants, in accordance with some embodiments.

FIG. 9 is a flow chart diagram of a method 900 for eliciting and processing a speech samples from vehicle occupants to verify the number of vehicle occupants, in accordance with some embodiments. The method 900 can be performed in steps 316 or 532, and at the start 902 the mobile device has activated the microphone of the mobile device to receive audio. Method 900 in particular uses the active manner of collecting speech samples, and thus in step 904 the mobile device prompts the occupants to speak, and in step 906 one occupant speaks allowing the mobile device to capture a speech sample of that occupant. The parameters of the speech sample (e.g., pitch, harmonic content) are then characterized. A common means of charactering voice is by the user of voice encoding, as is well known. In step 908 the mobile device determines if the number of speech samples received is equal to the number of occupants input by the user. If not, then the process repeats steps 904, 906, 908 until enough samples have been collected. The samples can be arbitrary speech, or directed by the mobile device so as to ensure the received voice is real and not artificial (e.g., a radio). In step 910 the parameters of the speech samples are compared to determine if they are sufficiently distinct. In step 912, if the samples are sufficiently distinct, then in step 914 the method 900 terminates. Otherwise, in step 916 the mobile device indicates that the different occupants could not be verified, in step 918 the user is allowed to either repeat the process, or self-confirm the number.

Figure 10:
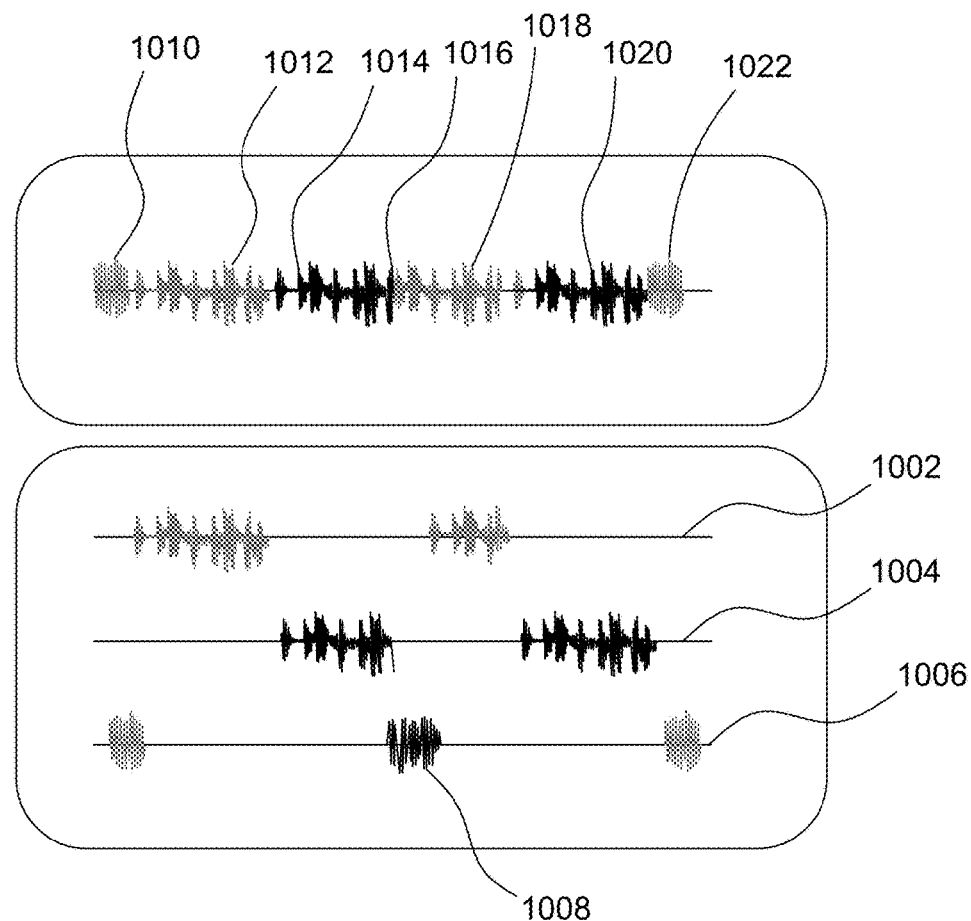
FIG. 10 shows a speech analysis diagram for analyzing free form speech to identify different speakers in order to verify a number of vehicle occupants, in accordance with some embodiments.

FIG. 10 shows a speech analysis diagram for analyzing free form speech to identify different speakers in order to verify a number of vehicle occupants, in accordance with some embodiments. This figure represents the process of passive speaker identification where the mobile device listens to conversation in the vehicle. Thus, an aggregate sample 1000 is collected in which several different people are speaking, and further non-speech sounds can be heard. For example, assume there are two speakers, speaker A and speaker B. Speech sample 1000 includes periods where neither speaker is speaking by non-speech noise 1010, 1022 is heard. Speaker A can speak at portions 1012, 1018, and speaker B speaks at portions 1014, 1020. Some of 1014 and 1016 can overlap. These portions can be identified by voice parameters (e.g., voice encoding) such that speaker A segments can be identified as indicated by line 1002, speaker B segments can be identified as indicated by line 1004, and non-voice or indeterminable voice segments, as indicated by line 1006, can be ignored.

Figure 11:
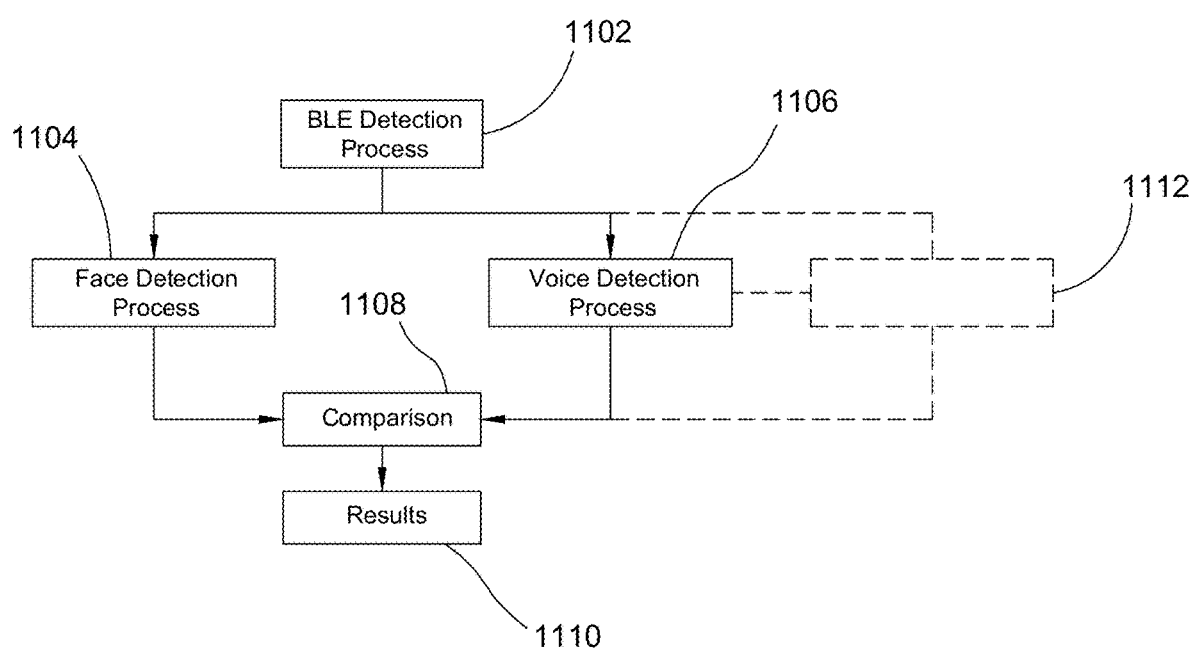
FIG. 11 shows a generalized vehicle occupant number verification method flow chart diagram for dealing with false positive detections in one occupant sensing modality, in accordance with some embodiments.

FIG. 11 shows a generalized vehicle occupant number verification method 1100 flow chart diagram for dealing with false positive detections in one occupant sensing modality, in accordance with some embodiments. In general, the use of multiple occupant sensing modalities overcomes the detection of false positive detections that can occur with any given single detection modality. Thus, the mobile device can perform several different occupant sensing processes. For example, in some embodiments, the detection of other mobile devices in step 1102 can always be undertaken. Then other occupant sensing processes, such as face detection 1104 and voice detection 1106 can be performed. A comparison 1108 of the results of these occupant detection processes can be evaluated to determine if there is sufficient indication to believe the indicated number of occupants are actually present in the vehicle. The output 1110 of the comparison process 1108 is evaluated to make that determination. Additional occupant detection processes 1112 can be undertaken as well. An example of one additional occupant detection modality is to identify each of the other mobile devices in the vehicle, and have them, responsive to running an instantiation of the tolling application program, report their location to the backend server periodically. The co-location of all of the mobile devices can be used to verify that the occupants are traveling together.

Figure 12:
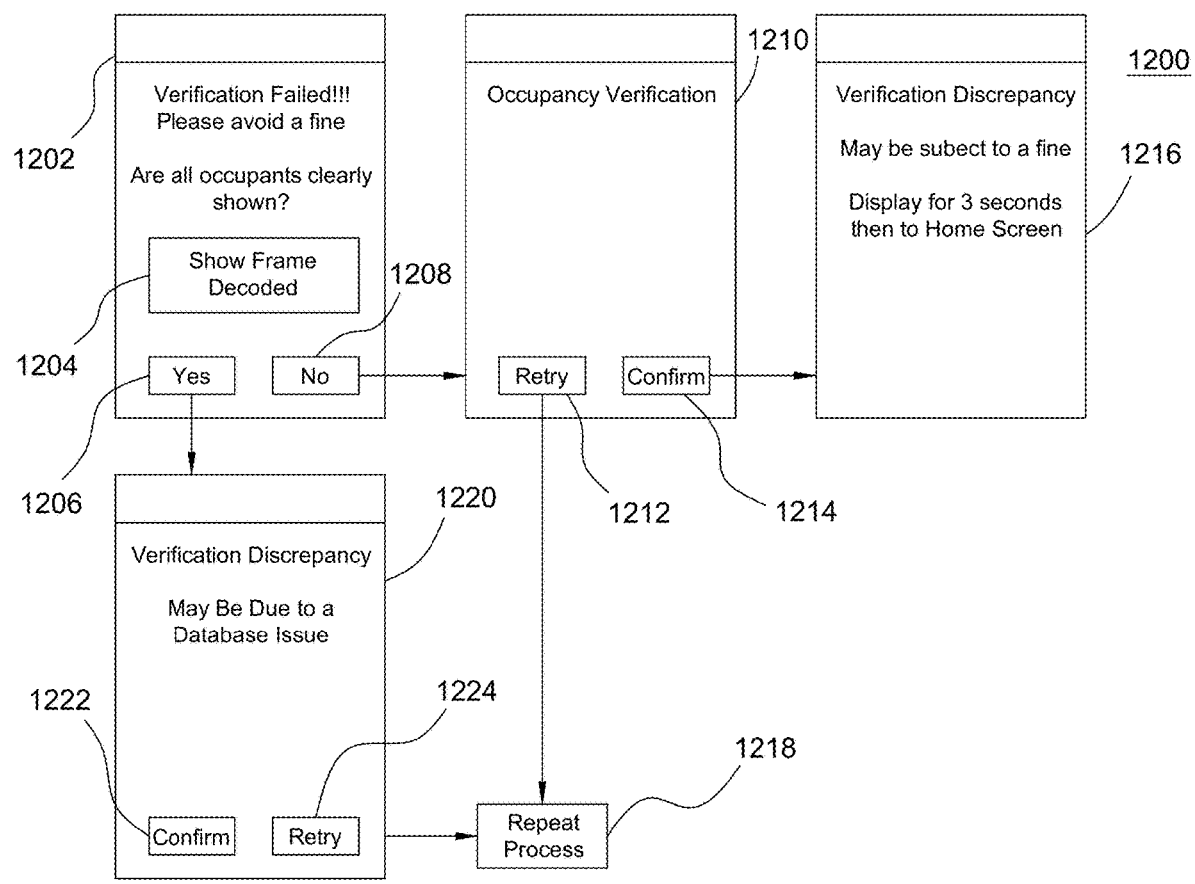
FIG. 12 shows an interface diagram of a tolling application on a mobile device in which the number of vehicle occupants does not match a user input, in accordance with some embodiments.

FIG. 12 shows an interface diagram 1200 of a tolling application on a mobile device in which the number of vehicle occupants does not match a user input, in accordance with some embodiments. The diagram 1200 shows various examples of interfaces that can be presented to the user for self-confirmation of the number of occupants. For example, interface 1202 can be presented when the number of occupants detected using face detection, voice detection, mobile device detection, and so on, do not agree with the number of occupants indicated by the user. The process can work in reverse as well, where the user does not first input a number, rather, the user prompts the mobile device to undertake two or more occupant detection processes, and then if the number of those two (or more) occupant detection processes agree, the number of detected occupants can be presented to the user for confirmation, retry, or subsequent self-confirmation. In interface 1202 the user is informed that the verification has failed. When a face detection process is used, for example, a frame 1204 of the front facing camera can be shown to allow the user to verify that all of the occupants are visible in the frame. The user can then select "yes" 1206 or "no" 1208. If the user selects "yes" then the self-confirmation interface 1220 can be displayed in which a caution message is displayed, and the user can either "confirm" 1222 or "retry" 1224. If the user indicates "no" in interface 1202, then an occupancy detection interface 1210 is shown in which the user can either "retry" 1212 or "confirm" 1214. If the user selects "retry" 1212 then the process is repeated (represented by box 1218). If the user selects "confirm" in interface 1210 then a final caution interface 1216 is displayed.

Once the user confirms (1222 or 1214), then a database record is added for Law Enforcement (LE) and tolling agency records that indicates there is a discrepancy for occupancy verification. The LE application programming interface (API) can be accessible to officers on patrol and information can be communicated that include the relevant vehicle information, location and number of occupants selected together with an indication of the verification or discrepancy.

The LE API format can include the following information:
1. Timestamp
2. GPS coordinates
3. Vehicle Make and Model
4. Vehicle Color
5. Vehicle Year
6. Number of Axles
7. State/Tag Number
8. User Entered Occupants—XX
9. Verified Occupants—YY The confirmation button approach was adopted after receiving negative feedback from survey and agencies' staff for our original Automated Vehicle Occupancy Verification system with over-riding user's declaration.

What is claimed is:

1. A method for determining and verifying occupants of a vehicle by a mobile device operating a tolling application program in order to discount toll charges, the method comprising:
   prompting, by the mobile device, responsive to operation of the tolling application program, a user of the mobile device to enter a number of vehicle occupants into the mobile device;
   receiving, at the mobile device, responsive to the prompting, an input indicative of the number of vehicle occupants;
   responsive to receiving the input, the mobile device verifying the number of vehicle occupants by performing at least two verification processes, including capturing and analyzing an image to identify human faces in the image and further identifying interior features of a vehicle in the image, and at least one of:
      detecting, by the mobile device, other mobile devices using a local range wireless network interface; or
      receiving and analyzing a human speech sample in which several people speak to identify a number of different speakers.

2. The method of claim 1, wherein capturing and analyzing the image includes:
   taking an image of occupants of the vehicle by the mobile device;
   recognizing, using a facial recognition process, a plurality of human faces in the image;
   counting the number of recognized human faces in the image; and
   comparing the number of human faces recognized in the image with the number of vehicle occupants.

3. The method of claim 2, wherein the image is processed by the mobile device by:
   demarking each identified human face with a border;
   obscuring the image content within each border for each identified human face; and
   transmitting the obscured image to a backend server of a tolling service.

4. The method of claim 1, wherein detecting other mobile devices using the local range wireless network interface comprises detecting a beacon that is transmitted by each one of the other mobile device.

5. The method of claim 1, wherein receiving and analyzing the human speech sample comprises the mobile device prompting and then receiving the speech sample.

6. The method of claim 5, wherein prompting and then receiving the speech sample comprises prompting to repeat a randomly selected phrase.

7. The method of claim 1, wherein performing at least two verification processes further includes:
   the mobile device communicating with a controller of the vehicle; and
   querying the controller of the vehicle for a count of seat weight sensors or seat belt sensors indicating a person is sitting in a respective seat of the vehicle.

8. A method for verifying a number of occupants in a vehicle, comprising:

receiving an input at a mobile device indicating a selected number of occupants;
responsive to receiving the selected number of occupants, operating a camera of the mobile device to capture a view of the camera;
verifying the selected number of occupants using a facial recognition process to:
   automatically present a camera interface on the mobile device;
   in response to a user input at the camera interface, capturing an image with the camera;
   processing the image to identify human faces in the image; and
   counting a number of human faces identified;
comparing the number of human faces identified in the image with the selected number of occupants;
further processing the image to identify interior features of a vehicle in the image; and
either confirming the number of occupants when the number of human faces in the image matches the selected number of occupants and at least one interior feature of the vehicle is recognized, or presenting a discrepancy interface indicating that the selected number of occupants could not be verified when the number of human faces in the image does not match the selected number of occupants.

9. The method of claim 8, wherein verifying the selected number of occupants further comprises, in addition to using the facial recognition, detecting, by the mobile device, other mobile devices using a local range wireless network interface.

10. The method of claim 8, wherein verifying the selected number of occupants further comprises, in addition to using the facial recognition, receiving and analyzing a human speech sample in which several people speak to identify a number of different speakers.

11. The method of claim 8, wherein, upon presenting the discrepancy interface indicating that the selected number of occupants could not be verified, allowing a user of the mobile device to self-confirm the number of occupants.

12. The method of claim 11, wherein, upon allowing the user of the mobile device to self-confirm the number of occupants, the mobile device transmitting a message to a backend server and the backend server transmitting a message to a law enforcement agency identify a vehicle associated with the user of the mobile device.

13. A method for verifying a number of occupants in a vehicle for toll payment, comprising:

presenting, on a mobile device, an interface screen prompting a user to enter a number of occupants of the vehicle;
receiving from the user at the mobile device, an input indicating a number;
the mobile device using at least two occupant sensing processes to detect a number of occupants in the vehicle, wherein one of the at least two occupant sensing processes is a face detection process that includes the mobile device using a camera of the mobile device to capture an image of an interior of the vehicle wherein the mobile device processes the image to recognize at least one human face and an interior feature of a vehicle in the image;
comparing the results of each of the at least two occupant sensing processes;
when the results of the at least two occupant sensing processes agree with number provided in the input from the user, the mobile device transmitting a message to a backend server of a toll service indicating the number of occupants and that the number was verified by the mobile device; and
when the results of the each of the at least two occupant sensing processes do not agree with the number provided in the input from the user, the mobile device presenting an interface screen in which the user can either have at least one of the at least two occupant sensing processes repeated or self-confirm the number of occupants.

14. The method of claim 13, wherein one of the at least two occupant sensing processes includes the mobile device using a low power wireless networking interface to detect at least one other mobile device.

15. The method of claim 13, wherein one of the at least two occupant sensing processes is a speech sensing process that includes the mobile device using a microphone of the mobile device to capture a speech sample from each occupant of the vehicle;
the mobile device processing each speech sample to identify several speech parameters of each speech sample;
comparing the speech parameters of each speech sample to identity a number of the speech samples that are unique; and
using the number of speech samples that are unique as the number of occupants identified by the speech sensing process.

* * * * *